US009280847B2

(12) United States Patent
Ogishima et al.

(10) Patent No.: US 9,280,847 B2
(45) Date of Patent: Mar. 8, 2016

(54) IMAGE COMPOSITION APPARATUS, IMAGE RETRIEVAL METHOD, AND STORAGE MEDIUM STORING PROGRAM

(75) Inventors: Kiyoshi Ogishima, Akiruno (JP); Yoshihisa Matsumoto, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 875 days.

(21) Appl. No.: 13/272,448

(22) Filed: Oct. 13, 2011

(65) Prior Publication Data

US 2012/0092338 A1    Apr. 19, 2012

(30) Foreign Application Priority Data

Oct. 15, 2010  (JP) .................................. 2010-232042
Aug. 29, 2011  (JP) .................................. 2011-185935

(51) Int. Cl.
  *G06T 15/00* (2011.01)
  *G06T 15/50* (2011.01)
  *H04N 13/02* (2006.01)

(52) U.S. Cl.
  CPC .......... *G06T 15/503* (2013.01); *H04N 13/0275* (2013.01); *H04N 13/0292* (2013.01)

(58) Field of Classification Search
  CPC ............. G06T 15/503; H04N 13/0275; H04N 13/0292
  See application file for complete search history.

(56) References Cited

U.S. PATENT DOCUMENTS

| 2001/0012054 A1* | 8/2001 | Sudo ............................. 348/51 |
| 2005/0253924 A1* | 11/2005 | Mashitani ...................... 348/42 |
| 2010/0091012 A1 | 4/2010 | Newton et al. |

FOREIGN PATENT DOCUMENTS

| CN | 101523924 A | 2/2009 |
| CN | 101610421 A | 12/2009 |
| JP | 11-341522 A | 12/1999 |
| JP | 11341522 | * 12/1999 |
| JP | 2004-134950 A | 4/2004 |

OTHER PUBLICATIONS

Chinese Office Action dated Feb. 11, 2014 (and English translation thereof) in counterpart Chinese Application No. 201110309973.X.

* cited by examiner

*Primary Examiner* — Dave Czekaj
*Assistant Examiner* — M D Haque
(74) *Attorney, Agent, or Firm* — Holtz, Holtz & Volek PC

(57) ABSTRACT

There is provided an image retrieval method including obtaining a parallax that exists in a material image which is viewed as an object in a three-dimensional manner, retrieving a three-dimensional image that satisfies a predetermined condition as a selectable candidate image from a plurality of three-dimensional images, each of which is viewed in a three-dimensional manner, and executing image composition by superposing the material image on the three-dimensional image that is retrieved as the selectable candidate image in the retrieving of the three-dimensional image.

17 Claims, 11 Drawing Sheets

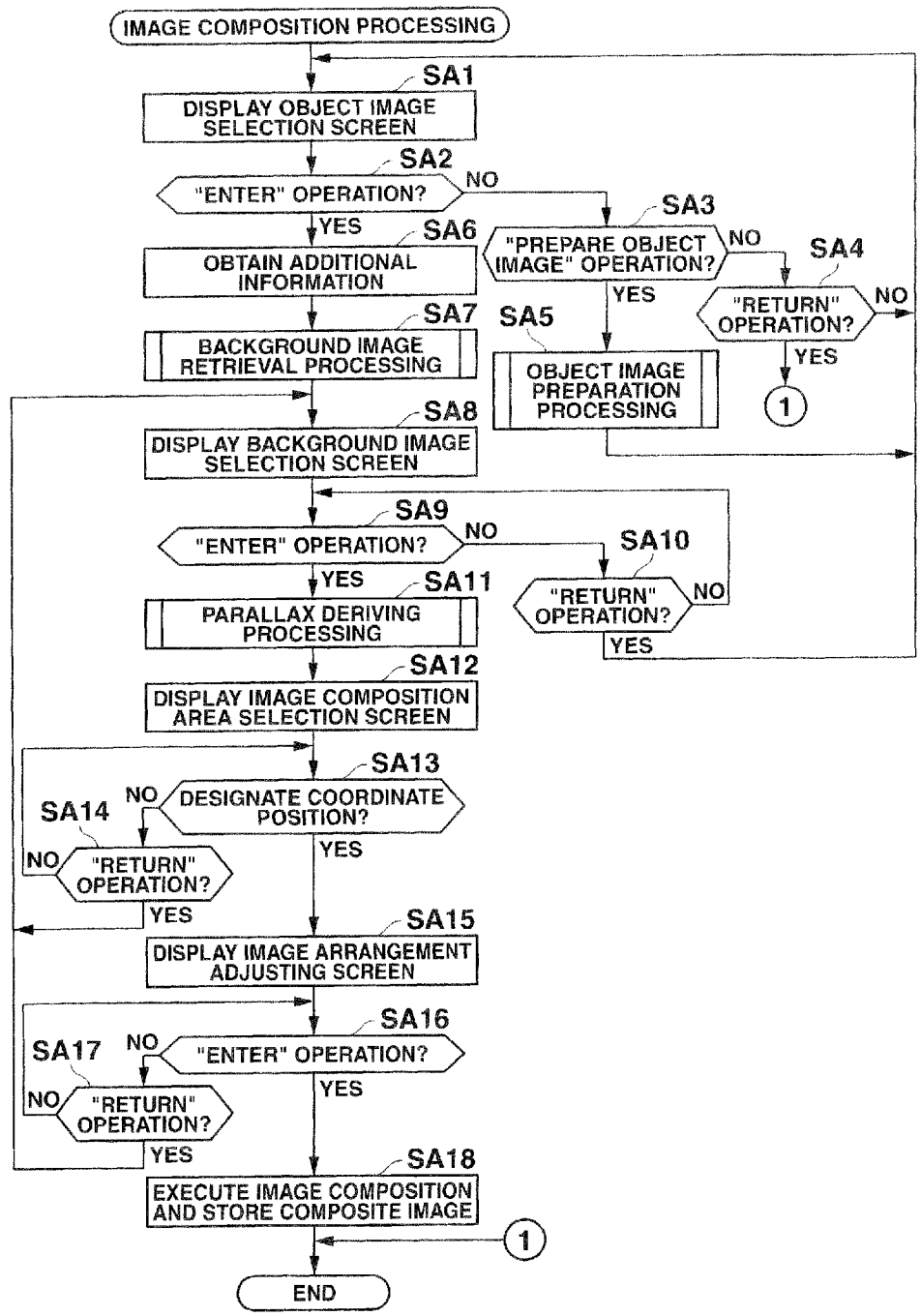

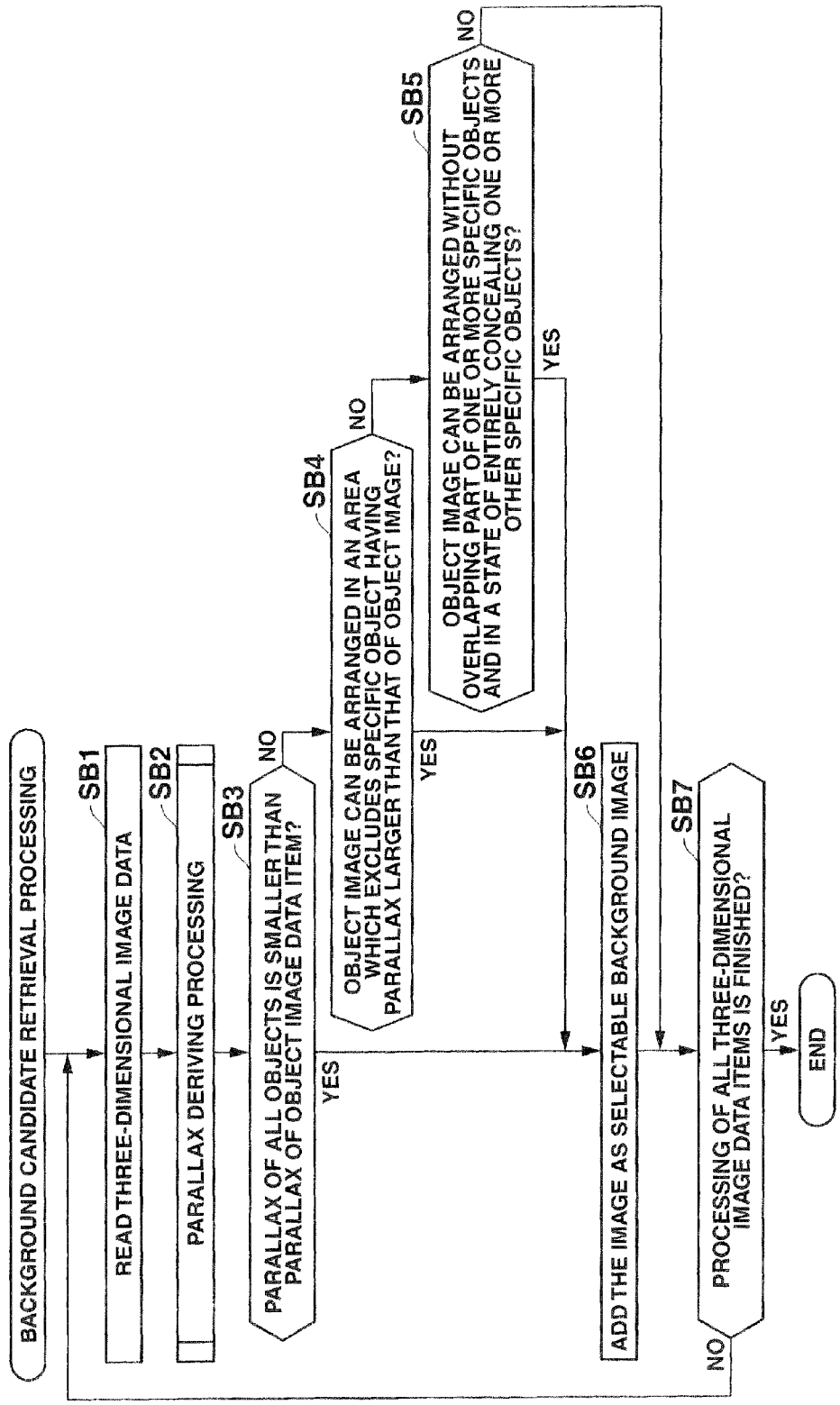

FIG.8A

$$\begin{pmatrix} -1 & -1 & -1 \\ -1 & -8 & -1 \\ -1 & -1 & -1 \end{pmatrix}$$

FIG.8B

$$\begin{pmatrix} -1 & -3 & -4 & -3 & -1 \\ -3 & 0 & 6 & 0 & -3 \\ -4 & 6 & 20 & 6 & -4 \\ -3 & 0 & 6 & 0 & -3 \\ -1 & -3 & -4 & -3 & -1 \end{pmatrix}$$

IMAGE COMPOSITION APPARATUS, IMAGE RETRIEVAL METHOD, AND STORAGE MEDIUM STORING PROGRAM

CROSS-REFERENCE TO RELATED APPLICATIONS

This application is based upon and claims the benefit of priority from prior Japanese Patent Applications No. 2010-232042, filed Oct. 15, 2010; and No. 2011-185935, filed Aug. 29, 2011, the entire contents of all of which are incorporated herein by reference.

BACKGROUND OF THE INVENTION

1. Field of the Invention

The present invention relates to an image composition apparatus, an image retrieval method, and a storage medium storing program.

2. Description of the Related Art

For example, as disclosed in Jpn. Pat. Appln. KOKAI Pub. No. 2004-134950 (hereinafter referred to as Patent Document 1), a conventional technique of executing image composition by superposing a material image on an image taken by a digital camera or the like has been well known in the prior art.

In addition, as disclosed in Jpn. Pat. Appln. 11-341522 (hereinafter referred to as Patent Document 2), known is a technique of preparing a pair of left and right images, which have parallax between them, that is, a left-eye image and a right-eye image in which the position of the same object in the image is shifted to the left and the right, causing the user to view the left-eye image by the left eye and view the right-eye image by the right eye, and thereby causing the user to view the image in a three-dimensional manner (as a three-dimensional image).

In the meantime, the left-eye image and the right-eye image which form an image (hereinafter referred to as "three-dimensional image") which is viewed in a three-dimensional manner by the technique disclosed in Patent Document 2 are still images which are similar to images taken by a digital camera or the like. Therefore, it is possible to extract a partial image (hereinafter referred to as "object image") which corresponds to a part (hereinafter referred to as "object") that is recognized as an independent object such as a person from a three-dimensional image, and superpose the extracted partial image on another three-dimensional image. Specifically, a left-eye image of an object image is superposed on a left-eye image which forms a three-dimensional image forming a background, a right-eye image of the object image is superposed on a right-eye image which forms the three-dimensional image forming the background, and thereby a new three-dimensional image can be formed.

However, in the case where a three-dimensional image includes a plurality of objects which are viewed in a three-dimensional manner as having different distances, when part of an object which is perceived as relatively existing in the front is hidden by another object which is perceived as relatively existing in the rear, the three-dimensional image produces a very unnatural impression. Therefore, when a desired object image is superposed on any of a plurality of prepared three-dimensional images, it is necessary to select a three-dimensional image for a background, which is suitable for image composition, in consideration of a difference in distance from other objects in a composed three-dimensional image.

Therefore, when a background three-dimensional image is selected, it is necessary for the operator to check in advance whether or not a composed three-dimensional image produces an unnatural impression, by viewing the object image together with each three-dimensional image which can be selected as a background in a three-dimensional manner. This requires much labor for selecting a background three-dimensional image, and causes the problem of increase in the load on the operator.

BRIEF SUMMARY OF THE INVENTION

According to one aspect of the present invention, there is provided an image composition apparatus comprising: a parallax obtaining unit configured to obtain a parallax that exists in a material image which is viewed as an object in a three-dimensional manner; an image retrieving unit configured to retrieve a three-dimensional image that satisfies a predetermined condition as a selectable candidate image from a plurality of three-dimensional images, each of which is viewed in a three-dimensional manner; and an image composition unit configured to execute image composition by superposing the material image on the three-dimensional image that is retrieved as the selectable candidate image by the image retrieving unit, each of the three-dimensional images including at least one object, and the image retrieving unit retrieving the three-dimensional image as the selectable candidate image from the three-dimensional images, on a condition that all the at least one object included in the three-dimensional image to be retrieved as the selectable candidate image among the three-dimensional images is a first parallax object which has a parallax that is smaller than the parallax of the material image obtained by the parallax obtaining unit, as the predetermined condition.

According to another aspect of the present invention, there is provided an image composition apparatus comprising: a parallax obtaining unit configured to obtain a parallax that exists in a material image which is viewed as an object in a three-dimensional manner; an image retrieving unit configured to retrieve a three-dimensional image that satisfies a predetermined condition as a selectable candidate image from a plurality of three-dimensional images, each of which is viewed in a three-dimensional manner; and an image composition unit configured to execute image composition by superposing the material image on the three-dimensional image that is retrieved as the selectable candidate image by the image retrieving unit, each of the three-dimensional images including at least one object, and the image retrieving unit retrieving the three-dimensional image as the selectable candidate image from the three-dimensional images, on a condition that the at least one object included in the three-dimensional image to be retrieved as the selectable candidate image among the three-dimensional images is a second parallax object which has a parallax equal to or larger than the parallax of the material image obtained by the parallax obtaining unit, and the material image has a shape and a size with which the material image is capable of being arranged in an area excluding the second parallax object, as the predetermined condition.

According to still another aspect of the present invention, there is provided an image composition apparatus comprising: a parallax obtaining unit configured to obtain a parallax that exists in a material image which is viewed as an object in a three-dimensional manner; an image retrieving unit configured to retrieve a three-dimensional image that satisfies a predetermined condition as a selectable candidate image from a plurality of three-dimensional images, each of which is viewed in a three-dimensional manner; and an image composition unit configured to execute image composition by superposing the material image on the three-dimensional image that is retrieved as the selectable candidate image by the image retrieving unit, each of the three-dimensional images including at least one object, and the image retrieving unit retrieving the three-dimensional image as the selectable candidate image from the three-dimensional images, on a condition that the at least one object included in the three-dimensional image to be retrieved as the selectable candidate image among the three-dimensional images is a second parallax object which has a parallax equal to or larger than the parallax of the material image obtained by the parallax obtaining unit, and the material image has a shape and a size with which the material image is capable of being arranged to be superposed on the whole of the second parallax object, as the predetermined condition.

According to still another aspect of the present invention, there is provided an image retrieval method, comprising: obtaining a parallax that exists in a material image which is viewed as an object in a three-dimensional manner; retrieving a three-dimensional image that satisfies a predetermined condition as a selectable candidate image from a plurality of three-dimensional images, each of which is viewed in a three-dimensional manner; and executing image composition by superposing the material image on the three-dimensional image that is retrieved as the selectable candidate image in the retrieving of the three-dimensional image, each of the three-dimensional images including at least one object, and the retrieving including retrieving the three-dimensional image as the selectable candidate image from the three-dimensional images, on a condition that all the at least one object included in the three-dimensional image to be retrieved as the selectable candidate image among the three-dimensional images is a first parallax object which has a parallax that is smaller than the parallax of the material image obtained, as the predetermined condition.

According to still another aspect of the present invention, there is provided an image retrieval method comprising: obtaining a parallax that exists in a material image which is viewed as an object in a three-dimensional manner; retrieving a three-dimensional image that satisfies a predetermined condition as a selectable candidate image from a plurality of three-dimensional images, each of which is viewed in a three-dimensional manner; and executing image composition by superposing the material image on the three-dimensional image that is retrieved as the selectable candidate image in the retrieving of the three-dimensional image, each of the three-dimensional images including at least one object, and the retrieving including retrieving the three-dimensional image as the selectable candidate image from the three-dimensional images, on a condition that the at least one object included in the three-dimensional image to be retrieved as the selectable candidate image among the three-dimensional images is a second parallax object which has a parallax equal to or larger than the parallax of the material image obtained, and the material image has a shape and a size with which the material image is capable of being arranged in an area excluding the second parallax object, as the predetermined condition.

According to still another aspect of the present invention, there is provided a non-transitory computer-readable storage medium having program code stored thereon for causing a computer to perform image retrieval, the program code comprising: obtaining a parallax that exists in a material image which is viewed as an object in a three-dimensional manner; retrieving a three-dimensional image that satisfies a predetermined condition as a selectable candidate image from a plurality of three-dimensional images, each of which is viewed in a three-dimensional manner; and executing image composition by superposing the material image on the three-dimensional image that is retrieved as the selectable candidate image in the retrieving of the three-dimensional image, each of the three-dimensional images including at least one object, and the retrieving including retrieving the three-dimensional image as the selectable candidate image from the three-dimensional images, on a condition that all the at least one object included in the three-dimensional image to be retrieved as the selectable candidate image among the three-dimensional images is a first parallax object which has a parallax that is smaller than the parallax of the material image obtained, as the predetermined condition.

According to still another aspect of the present invention, there is provided a non-transitory computer-readable storage medium having program code stored thereon for causing a computer to perform image retrieval, the program code comprising: obtaining a parallax that exists in a material image which is viewed as an object in a three-dimensional manner; retrieving a three-dimensional image that satisfies a predetermined condition as a selectable candidate image from a plurality of three-dimensional images, each of which is viewed in a three-dimensional manner; and executing image composition by superposing the material image on the three-dimensional image that is retrieved as the selectable candidate image in the retrieving of the three-dimensional image, each of the three-dimensional images including at least one object, and the retrieving including retrieving the three-dimensional image as the selectable candidate image from the three-dimensional images, on a condition that the at least one object included in the three-dimensional image to be retrieved as the selectable candidate image among the three-dimensional images is a second parallax object which has a parallax equal to or larger than the parallax of the material image obtained, and the material image has a shape and a size with which the material image is capable of being arranged in an area excluding the second parallax object, as the predetermined condition.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 1A and 1B are schematic diagrams of a digital photo frame, in which FIG. 1A illustrates a front of the digital photo frame, and FIG. 1B illustrates a side of the digital photo frame.

FIGS. 3A and 3B are explanatory diagrams of screens which are displayed on a display unit, in which FIG. 3A illustrates a screen displayed when the power is turned on, and FIG. 3B illustrates a screen displayed when image editing is selected.

FIG. 4 is a flowchart for explaining image composition processing.

FIGS. 5A, 5B, 5C, and 5D are explanatory diagrams of screens which are displayed on the display unit, in which FIG. 5A illustrates an object image selection screen, FIG. 5B illustrates a background image selection screen, FIG. 5C illustrates an image composition area selection screen, and FIG. 5D illustrates an image arrangement adjusting screen.

FIG. 6 is a flowchart for explaining background candidate retrieving processing.

FIGS. 8A and 8B are explanatory diagrams of a Laplacian filter, in which FIG. 8A illustrates a block diagram of a filter of 3×3 matrixes, and FIG. 8B illustrates a block diagram of a filter of 5×5 matrixes.

FIGS. 11A and 11B are explanatory diagrams of screens which are displayed on the display unit, in which FIG. 11A illustrates an extraction image selection screen, and FIG. 11B illustrates an object selection screen.

DETAILED DESCRIPTION OF THE INVENTION

Embodiments of the present invention will be explained with reference to the drawings.

The present embodiment relates to a digital photo frame which has a function as an image composition apparatus of the present invention. The digital photo frame is an apparatus which has a main purpose of displaying images that are taken by a digital camera or the like and recorded as image data items, as images to be viewed. The digital photo frame of the present embodiment also has a function of displaying a pair of left and right images composed of a left-eye image and a right-eye image, as a three-dimensional image, and a function of executing image composition using three-dimensional images. The digital photo frame of the present embodiment will be explained hereinafter with reference to the drawings.

Figure 1A:
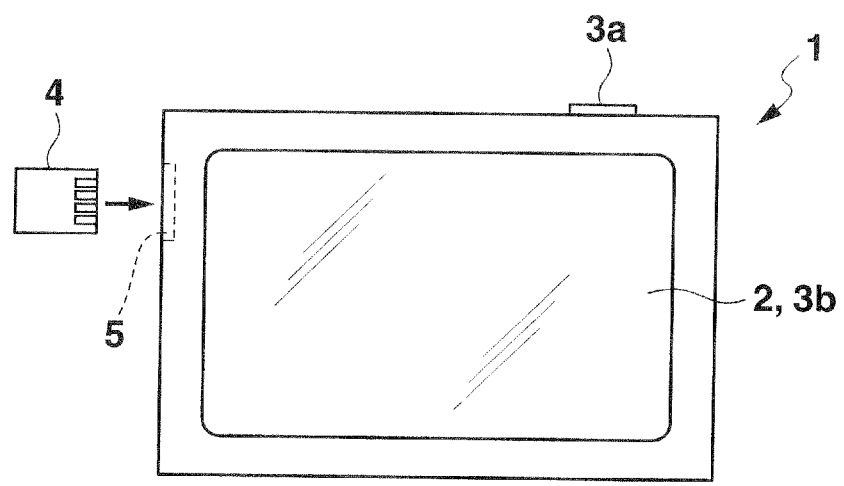
Figure 1B:
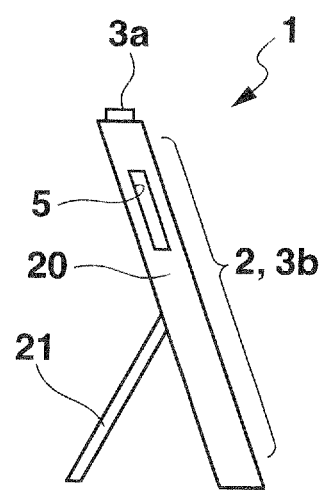

FIGS. 1A and 1B are schematic diagrams of a digital photo frame 1 of the present embodiment, in which FIG. 1A illustrates a front of the digital photo frame 1, and FIG. 1B illustrates a side of the digital photo frame 1.

As illustrated in FIGS. 1A and 1B, the digital photo frame 1 of the present embodiment includes a display unit 2 which is provided on a front surface of a main body 20, a power switch 3a, a touch panel 3b which is disposed to be superposed on the display unit 2, and a medium attachment unit 5, to which a card-type storage medium 4 that stores various image data items is attached. A back surface of the main body 20 of the digital photo frame 1 is provided with a stand 21 which can be opened and closed with respect to the main body 20 such that the main body 20 can stand in a state of being slightly inclined backward.

Figure 2:
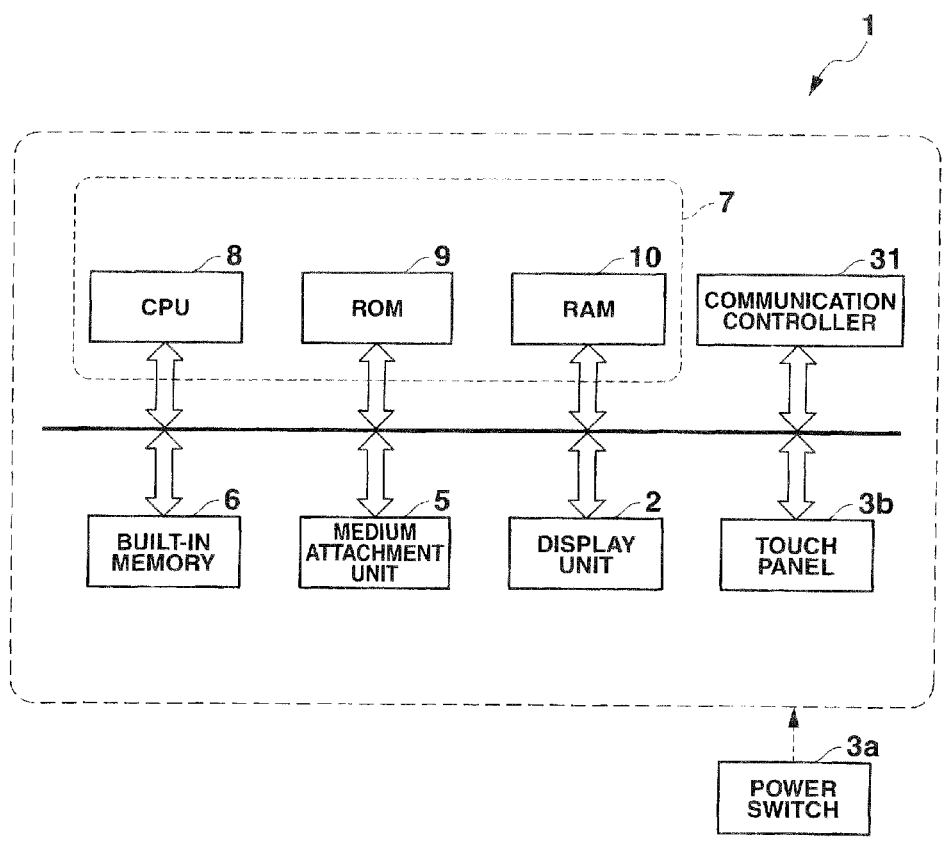
FIG. 2 is a diagram illustrating a system configuration of the digital photo frame.

FIG. 2 is a system configuration diagram which illustrates an electrical structure of the digital photo frame 1. As illustrated in FIG. 2, the digital photo frame 1 includes a built-in memory 6, a controller 7, and a communication controller 31, in addition to the display unit 2, the power switch 3a, the touch panel 3b, and the medium attachment unit 5.

The medium attachment unit 5 is specifically an input/output interface which controls input and output of data between the storage medium 4 and the controller 7, and is formed of a circuit for the control. The storage medium 4 stores a plurality of image data items.

The image data items stored in the storage medium 4 include image data items obtained by shooting by, for example, a digital camera, and three-dimensional image data items.

Each of the image data items obtained by a digital camera is a data item which is stored as a data file, to which additional information such as the shooting data and thumbnail image (reduced image) data is added, together with basic information such as the size (the numbers of pixels in the vertical direction and the horizontal direction) of the image data item.

Each of the three-dimensional image data items is an image data item which indicates a three-dimensional image, which is formed of a left-eye image data item and a right-eye image data item that are formed by converting a pair of left and right photographs (left-eye image and right-eye image) taken by a stereo camera into digital data items, or a left-eye image data item and a right-eye image data item that are generated from a single image data item by using an image processing technique.

Each three-dimensional image data item is stored as a three-dimensional image file, which is formed by adding additional information such as thumbnail image data to an image data main body that is compressed by JPEG or the like. The three-dimensional image data main body is formed of a left-eye image data item and a right-eye image data item, and the thumbnail image data is also formed of a left-eye thumbnail image data item and a right-eye thumbnail image data item. In addition, identification information indicating that the data is a three-dimensional image data item is added to the three-dimensional image data item, together with basic information such as the size of the three-dimensional image data item (left-eye image data item and right-eye image data item).

The display unit 2 is, for example, a liquid crystal display module or an organic EL display module, which includes a backlight. The display unit 2 displays ordinary two-dimensional images and three-dimensional images based on image data that is read from the storage medium 4 through the medium attachment unit 5, and various display menus including one or a plurality of operation screens (hereinafter referred to as "soft keys"). The display unit 2 also displays a three-dimensional image based on a three-dimensional image data item that is generated by the controller 7.

The method of displaying a three-dimensional image that is used in the digital photo frame 1 is, for example, a parallax barrier method and a time-division displaying method.

The parallax barrier method is a method in which first pixels, the gradation of which is controlled based on the left-eye image data item, and second pixels, the gradation of which is controlled based on the right-eye image data item, are alternately arranged in the horizontal direction, and the user in a predetermined viewing position is caused to view the first pixels only by the left eye through a parallax barrier, and view the second pixels only by the right eye through the parallax barrier. Therefore, in the apparatus adopting the parallax barrier method, the display unit 2 has a structure in which a barrier display device such as a liquid crystal panel that displays (forms) a parallax barrier is provided in front of the display screen.

In addition, the time-division display method is a method in which a left-eye image based on the left-eye image data item and a right-eye image based on the right-eye image data item are alternately displayed in a time-division manner, and the field of vision of the user's left eye and the field of vision of the user's right eye are alternately shut off in synchronization with the display timings of the left-eye image and the right-eye image. Therefore, in an apparatus adopting the time-division display method, it is necessary for the user to wear field-of-vision controlling means such as glasses which alternately shut off the left and right fields of vision in synchronization with the display timings of the left-eye image and the right-eye image when three-dimensional images are viewed.

The touch panel 3*b* is an input device which detects a user's touching position in the display screen of the display unit 2 as input information, in a state where one or a plurality of soft keys are displayed on the display unit 2. A resistive touch panel or a capacitive touch panel can be adopted as the touch panel 3*b*.

The resistive touch panel detects a touching position by measuring the ratio of partial pressures obtained by resistance of the transparent electrode formed of relatively transparent ITO (Indium Tin Oxide). The capacitive touch panel detects a touching position by detecting a change in the surface charge, by using a plurality of transparent electrode patterns which are formed of an ITO film and extend to cross each other, as a sensor.

The built-in memory 6 is a flash memory, which holds its stored content even when the power is turned off, and the storage data thereof is rewritable. More specifically, the built-in memory 6 is an EEPROM (Electric Erasable Programmable Read Only Memory). The built-in memory 6 stores three-dimensional image data which are generated in the digital photo frame 1 as described later, and object image data.

Each object image data item, details of which will be described later, is a three-dimensional image data item which indicates a three-dimensional image (material image) which is viewed in a three-dimensional manner as a specific object such as a person, and formed of a pair of image data items including a left-eye image data item and a right-eye image data item. Each of the left-eye image data item and the right-eye image data item is a color image data item which has gradation values of a red component, a green component, and a blue component as color components for each of the display coordinates.

The controller 7 is formed of a CPU (Central Processing Unit) 8, a ROM (Read Only Memory) 9 which stores a control program to be executed by the CPU 8, and a RAM (Random Access Memory) 10 which serves as a work area.

The ROM 9 is a memory which stores a plurality of programs and data for causing the CPU 8 to control the whole system. The programs stored in the ROM 9 include a three-dimensional image composition program which causes the CPU 8 to function as parallax obtaining means, image retrieving means, image composition means, and image forming means in the present embodiment.

The RAM 10 is a work memory which temporarily stores various data when the CPU 8 controls the digital photo frame 1. Specifically, the RAM 10 is an SDRAM (Synchronous Dynamic Random-Access Memory) or the like.

The communication controller 31 performs communication processing of connecting the digital photo frame 1 to a network such as the Internet through a wired or wireless communication line, if necessary, and receiving various image data items from a server existing on the network. The image data items received by the communication controller 31 are image data items obtained by a digital camera or the like, three-dimensional image data items, and object image data items. The received image data items are stored in the storage medium 4 or the built-in memory 6.

Next, operation of the digital photo frame 1 having the above structure will be explained hereinafter. In the digital photo frame 1, when the power switch 3*a* is operated by the user and the power is turned on, the CPU 8 starts control based on the program stored in the ROM 9, and immediately displays a function selection menu on the display unit 2.

Figure 3A:
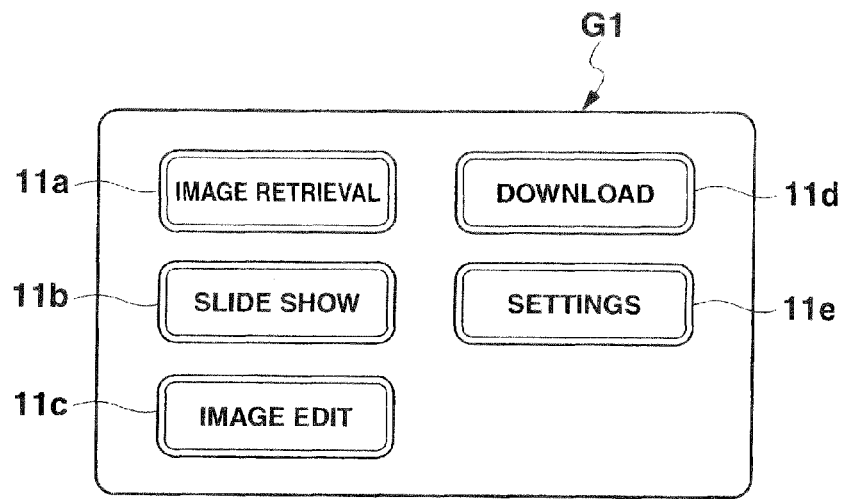

FIG. 3A illustrates an example of a function selection menu G1 displayed on the display unit 2. The function selection menu G1 is formed of a soft key 11*a* to which an image retrieval function is assigned, a soft key 11*b* to which a slide show function is assigned, a soft key 11*c* to which an image edit function is assigned, a soft key 11*d* to which a download function is assigned, and a soft key 11*e* to which a setting function is assigned.

The image retrieval function is a function of causing the user to select a desired image from images stored as image data items in the storage medium 4, and displaying the selected image on the display unit 2. The slide show function is a function of displaying a plurality of images, which are stored as image data items in the storage medium 4, in a predetermined order as a slide show. The image edit function is a function of editing an image stored as an image data item. The download function is a function of downloading various image data items from the network described above. The setting function is a function of setting operations relating to various functions of the digital photo frame 1.

While the function selection menu G1 is displayed, when the user touches any of the soft keys 11*a* to 11*d*, a position in an area which corresponds to the touched key among the 11*a* to 11*d* in the touch panel 3*b* is detected as a touched position, and the CPU 8 starts processing which corresponds to the function that is assigned to the touched soft key.

Figure 3B:
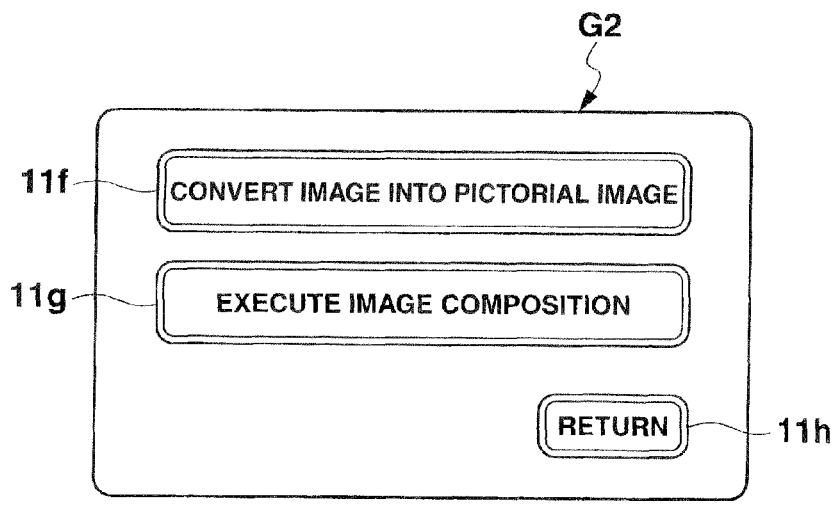

When the soft key 11*c* to which the image edit function is assigned is touched by the user, the CPU 8 displays an edit selection menu G2 as illustrated in FIG. 3B on the display unit 2. The edit selection menu G2 is formed of a soft key 11*f* to which a pictorial style converting function is assigned, a soft key 11*g* to which an image composition function is assigned, and a soft key 11*h* which shows "Return".

The pictorial style converting function is a function of causing the user to select a desired image from images stored as image data in the storage medium 4, subjecting the selected image (image data item) to image processing, and thereby converting the original image into a pictorial style image. The pictorial style image is an image which has a specific image tone (pictorial characteristic) such as a Japanese-style painting, a Western-style painting, a watercolor painting, an India-ink painting, and an ink drawing. The image composition function is a function of executing image composition using two different three-dimensional images which are stored in the storage medium 4 or the built-in memory 6 as three-dimensional image data items. The details of the image composition function will be described later.

In the digital photo frame 1, when the soft key 11*f*, to which the pictorial style converting function is assigned, is touched by the user in the edit selection menu G2, the CPU 8 goes to processing which corresponds to the pictorial style converting function. When the soft key 11*h* which shows "Return" is touched, the CPU 8 displays the function selection menu G1 on the display unit 2 again. Then, when the soft key 11*g*, to which the image composition function is assigned, is touched by the user in the edit selection menu G2, the CPU 8 executes image composition processing explained hereinafter, which corresponds to the image composition function.

The image composition processing in the present embodiment is processing of superposing a desired object image (material image) selected by the user as a foreground image on a part of a desired three-dimensional image selected by the user as a background. The three-dimensional image and the object image which are used in the image composition processing are stored as three-dimensional image data items in the storage medium 4 or the built-in memory 6. A specific process of the image composition processing executed by the CPU 8 will be explained hereinafter based on a flowchart illustrated in FIG. 4.

Figure 5A:
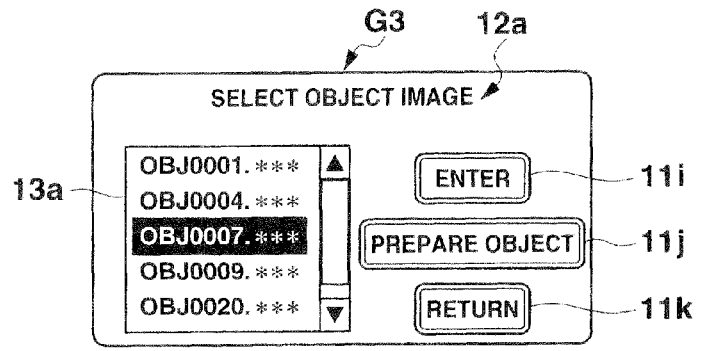

In the image composition processing, first, the CPU 8 displays an object image selection screen G3 illustrated in FIG. 5A on the display unit 2 (Step SA1). The object image selection screen G3 is formed of a message 12*a* such as "select object image", an image list 13*a* which shows images that are selectable as object images, a soft key 11*i* which shows "enter", a soft key 11*j* which shows "prepare object", and a soft key 11*k* which shows "Return".

When the object image selection screen G3 is displayed, the CPU 8 shows object image data items stored in the storage medium 4 and the built-in memory 6 in the image list 13*a* as selectable images. The listed object image data items are prepared by the CPU 8 in object image preparation processing of Step SA5 described later, and indicate material images which are used as a foreground image to be superposed on a desired three-dimensional image.

More specifically, each of the listed object image data items is a data item which is extracted from a three-dimensional image data item (left-eye image data item and right-eye image data item) stored in, for example, the storage medium 4, and an image data item which indicates an image of an area that corresponds to a desired object existing in the three-dimensional image indicated by the three-dimensional image data item.

For the sake of convenience, FIG. 5A illustrates the image list 13*a* which shows file names of the image files that store respective object image data items. However, actually, it is preferable to display a list of thumbnail images which are shown by thumbnail image data items added to the object image data items and viewed as three-dimensional images, or thumbnail images which are shown by one of left-eye thumbnail image data or right-eye thumbnail image data, and viewed as two-dimensional images.

While the object image selection screen G3 is displayed, when the user touches (operates) the soft key 11*k* which shows "Return" (Step SA4: YES), the CPU 8 immediately ends the image composition processing, and displays the edit selection menu G2 on the display unit 2 again.

While the object image selection screen G3 is displayed, when the user touches the soft key 11*j* which shows "prepare object" (Step SA3: YES), the CPU 8 executes object image preparation processing (Step SA5).

The object image preparation processing, details of which will be described later, is processing of extracting an object image data item from three-dimensional image data stored in the storage medium 4, and storing the extracted object image data item in the built-in memory 6 in advance. While the object image selection screen G3 is displayed, when any image file name displayed in the image list 13*a* is selected by the user by touching the touch panel 3*b*, the CPU 8 displays the selected image file name as outline characters.

Then, when the soft key 11*i* which shows "enter" is touched (Step SA2: YES) in the state where any image file name (object image data item) displayed in the image list 13*a* is selected, the CPU 8 obtains the following additional information which is added to the object image data item selected by the user (Step SA6).

The additional information obtained by the CPU 8 in the processing of Step SA6 is data items which indicate the size, the shape, and the parallax of the object image data item. The data item which indicates the size is the number of pixels (area) of the object image data item. The data item which indicates the shape is coordinate position data of each pixel of pixels which express the edge of the object in the three-dimensional image data item (one of the left-eye image data item and the right-eye image data item) from which the object image data item is extracted.

The data item which indicates the parallax is a horizontal position shift quantity of the object between the left-eye image which is indicated by the left-eye image data item, from which the object image data item is extracted, and the right-eye image which is indicated by the right-eye image data item. Specifically, the parallax which is added to the object image data item is information which is obtained by quantifying the distance which is perceived for a specific object when the object image indicated by the object image data item is viewed (viewed in a three-dimensional manner).

Thereafter, the CPU 8 performs background candidate retrieval processing based on the size, the shape, and the parallax of the object image data item obtained in the processing of Step SA6 (Step SA7). The background candidate retrieval processing is processing of retrieving and extracting three-dimensional image data items suitable in image composition to be superposed with the object image indicated by the object image data, among three-dimensional image data items stored in the storage medium 4 and the built-in memory 6.

FIG. 6 is a flowchart illustrating a process of the background candidate retrieval processing executed by the CPU 8. In the background candidate retrieval processing, the CPU 8 reads a plurality of three-dimensional image data items stored in the storage medium 4 and the built-in memory 6 in a predetermined order (Step SB1), and executes parallax deriving processing for the read three-dimensional image data items (Step SB2).

The parallax deriving processing is processing of obtaining a parallax which exists between the left-eye image data item and the right-eye image data item which form a three-dimensional image data item, for each object existing in a three-dimensional image indicated by the three-dimensional image data item. Specifically, the parallax which the CPU 8 obtains for each object is information which is obtained by quantifying the distance that is perceived for the object in the three-dimensional image when the three-dimensional image is viewed (in a three-dimensional manner).

A specific process of the parallax deriving processing executed by the CPU 8 will be detailed hereinafter based on a flowchart illustrated in FIG. 7. The case where the three-dimensional image data item is a color image data item will be mainly explained hereinafter.

In the parallax deriving processing, the CPU 8 individually performs grey-scale conversion for the left-eye image data item and the right-eye image data item by using, for example, the following expression [1] (Step SC1).

$$Y(i)=0.298912 \times R(i)+0.58611 \times G(i)+0.114478 \times B(i) \qquad [1]$$

In the expression [1], Y(i) is rounded to an integer, and i represents a coordinate position of a pixel, the gradation of which is controlled.

Next, the CPU 8 individually performs Laplacian filtering for the left-eye image data item and the right-eye image data item which have been subjected to grey scale conversion, and generates a left-eye image data item and a right-eye image data item, an edge of each of which is emphasized (Step SC2). As a Laplacian filter, for example, it is possible to use a digital filter of 3×3 matrixes as illustrated in FIG. 8A, or a digital filter of 5×5 matrixes as illustrated in FIG. 8B.

Then, the CPU 8 individually performs binarization for the edge-emphasized left-eye image data item and the right-eye image data item by using a boundary of a predetermined gradation threshold value, and thereby generates a left-eye image data item and a right-eye image data item as edge image data items obtained by extracting edges of the images (Step SC3). In the following explanation, the edge image data item which is generated based on the left-eye image data item is referred to as "left-eye edge image data item", and the edge image data item which is generated based on the right-eye image data item is referred to as "right-eye edge image data item", to distinguish them from each other.

Figure 9:
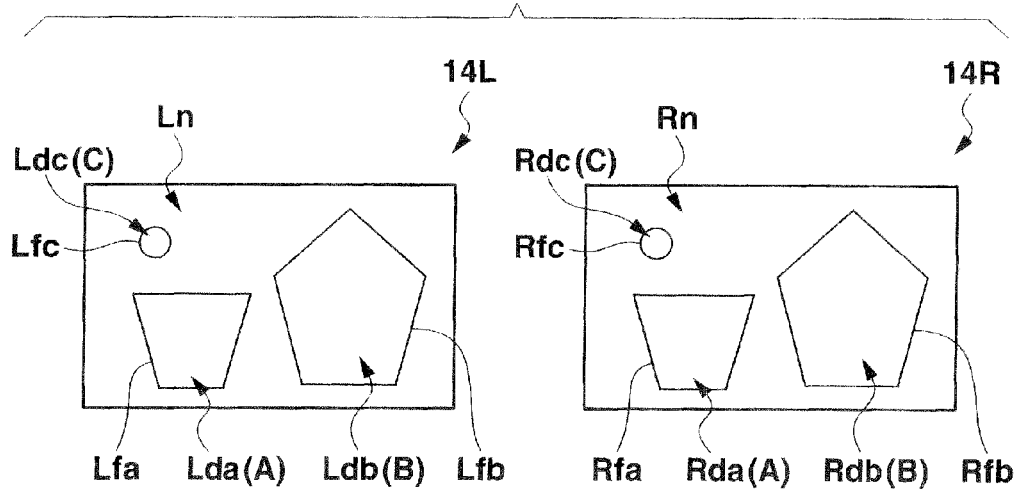
FIG. 9 is an explanatory diagram of edge image data obtained by binarization.

FIG. 9 is a diagram illustrating an example of a left-eye edge image data item 14L and a right-eye edge image data item 14R, which are obtained by binarization. Frame-like edges as outlines which indicate objects (partial area recognized as independent object such as a person) that are common to the image data items 14L and 14R can be obtained from each of the left-eye edge image data item 14L and the right-eye edge image data item 14R. Specifically, as illustrated in FIG. 9, when there are three objects in the three-dimensional image, three frame-like edges Lfa, Lfb, and Lfc are obtained in the left-eye edge image data item 14L, and three frame-like edges Rfa, Rfb, and Rfc are obtained in the right-eye edge image data item 14R.

Between the left-eye edge image data item 14L and the right-eye edge image data item 14R, an area Lda indicated by the edge Lfa and an area Rda indicated by the edge Rfa correspond to the same object A existing in the three-dimensional image. In addition, an area Ldb indicated by the edge Lfb and an area Rdb indicated by the edge Rfb correspond to the same object B existing in the three-dimensional image, and an area Ldc indicated by the edge Lfc and an area Rdc indicated by the edge Rfc correspond to the same object C existing in the three-dimensional image.

The horizontal position shift quantity in the image, which exists between the edge Lfa and the edge Rfa that correspond to each other, is the parallax of the object A. In the same manner, the horizontal position shift quantity in the image, which exists between the edge Lfb and the edge Rfb that correspond to each other, is the parallax of the object B, and the horizontal position shift quantity in the image, which exists between the edge Lfc and the edge Rfc that correspond to each other, is the parallax of the object C.

Therefore, after binarization, the CPU 8 individually obtains the coordinate position of each of the edges Lfa, Lfb, and Lfc existing in the left-eye edge image data 14L, and individually obtains the coordinate position of each of the edges Rfa, Rfb, and Rfc existing in the right-eye edge image data 14R and corresponding to the edges Lfa, Lfb, and Lfc, respectively, by pattern matching using block matching or the like (Step SC4).

Thereafter, the CPU 8 calculates the horizontal position shift quantity between the edge Lfa and the edge Rfa from the coordinate positions of the edge Lfa and the edge Rfa, and determines the calculated result as the parallax of the object A. The CPU 8 also calculates the horizontal position shift quantity between the edge Lfb and the edge Rfb from the coordinate positions of the edge Lfb and the edge Rfb, determines the calculated result as the parallax of the object B, calculates the horizontal position shift quantity between the edge Lfc and the edge Rfc from the coordinate positions of the edge Lfc and the edge Rfc, and determines the calculated result as the parallax of the object C (Step SC5).

When the edge image data obtained by binarization is the left-eye edge image data item 14L and the right-eye edge image data item 14R as illustrated in FIG. 9, areas Ln and Rn which are not enclosed by a frame-like edge are regarded as image areas having no parallax, and a position shift quantity thereof is determined as 0.

When the parallax deriving processing described above is finished, the CPU 8 returns to the processing illustrated in FIG. 6, and performs the following processing. First, the CPU 8 determines whether or not all the objects determined by the parallax deriving processing are first parallax objects, the parallax of which is smaller than the parallax of the object image data item (hereinafter also referred to as "selected object image") selected by the user (Step SB3). In other words, the CPU 8 determines whether or not the three-dimensional image data item to be processed satisfies the first condition that it indicates a three-dimensional image which includes no objects that have a parallax equal to or larger than the parallax of the selected object image.

Then, when the CPU 8 determines that all the objects are first parallax objects which have a parallax smaller than the parallax of the selected object image and the three-dimensional image data item to be processed satisfies the first condition (Step SB3: YES), the CPU 8 immediately adds the three-dimensional image data item to be processed as a selectable background image (Step SB6). Specifically, the CPU 8 stores the file name of the three-dimensional image data item to be processed in the RAM 10.

In addition, when the three-dimensional image data item to be processed does not satisfy the first condition (Step SB3: NO), the CPU 8 determines whether or not the three-dimensional image data item to be processed satisfies the second condition that it indicates a three-dimensional image in which the object image can be arranged in an area excluding second parallax objects which have a parallax equal to or larger than the parallax of the object image data item (Step SB4).

Then, when the three-dimensional image data item to be processed satisfies the second condition (Step SB4: YES), the CPU 8 adds the three-dimensional image data item to be processed as a selectable background image (Step SB6).

An example of the three-dimensional image data item which satisfies the second condition will be specifically explained hereinafter. In the following description, explained is the case where the three-dimensional image indicated by the three-dimensional image data item to be processed includes three objects A, B and C as illustrated in FIG. 9 in the above explanation of the parallax deriving processing, and any one of the objects is the second parallax object which has a parallax equal to or larger than the parallax of the selected object image.

In the above case, the three-dimensional image data item to be processed satisfies the second condition, when one object A is the second parallax object, and an area formed of the area Ldb (or the area Rdb), the area Ldc (or the area Rdc), and the area Ln (or the area Rn) illustrated in FIG. 9 has the pixel size and the shape in which the selected object image is contained. The three-dimensional image data item to be processed also satisfies the second condition, when the two objects B and C are the second parallax objects, and an area formed of the area Lda (or the area Rda) and the area Ln (or the area Rn) illustrated in FIG. 9 has the pixel size and the shape in which the selected object image is contained.

In addition, when the three-dimensional image data item to be processed satisfies neither the first condition nor the second condition (Step SB4: NO), the CPU 8 determines whether or not the three-dimensional image data item to be processed satisfies the third condition that it indicates a three-dimensional image in which the selected object image can be arranged without overlapping part of one or more second parallax objects and in a state of being superposed on the whole of one or more other second parallax objects (Step SB5).

When the CPU 8 determines that the three-dimensional image data item to be processed satisfies the third condition (Step SB5: YES), the CPU 8 adds the three-dimensional image data item to be processed as a selectable background image (Step SB6).

An example of the three-dimensional image data item which satisfies the third condition will be specifically explained hereinafter. In the following description, explained is the case where the three-dimensional image indicated by the three-dimensional image data item to be processed includes three objects A, B and C as illustrated in FIG. 9 in the above explanation of the parallax deriving processing, and the two objects B and C are the second parallax objects which have a parallax equal to or larger than the parallax of the selected object image.

In the above case, the three-dimensional image data item to be processed satisfies the third condition, when an area formed of the area Lda (or the area Rda), the area Ldc (or the area Rdc), and the area Ln (or the area Rn) illustrated in FIG. 9 has the pixel size and the shape in which the selected object image is contained, and the object image can be arranged such that the object image is superposed on the whole object C.

Although not shown, the three-dimensional image data item satisfies the third condition, when the three-dimensional image data item indicates a three-dimensional image which includes four or more or only two second parallax objects that have a parallax equal to or larger than the parallax of the selected object image, and in which the selected object image can be arranged such that the object image does not overlap at least part of one second parallax object but is superposed on the whole of the other parallax object(s).

Thereafter, the CPU 8 checks whether or not the above processing of Step SB2 and the following steps is finished for all the three-dimensional image data items in the storage medium 4 and the built-in memory 6 (Step SB7). When the three-dimensional image data item to be processed satisfies none of the first to third conditions (Step SB5: NO), the CPU 8 immediately checks whether or not the above processing of Step SB2 and the following steps is finished for all the three-dimensional image data items in the storage medium 4 and the built-in memory 6 (Step SB7).

When processing for all the three-dimensional image data items is not finished (Step SB7: NO), the CPU 8 returns to the processing of Step SB1, reads out a new three-dimensional image data item, and performs the processing of Step SB2 and the following steps for the read three-dimensional image data item. When processing of Step SB2 and the following steps for all the three-dimensional image data items in the storage medium 4 and the built-in memory 6 is finished (Step SB7: YES), the CPU 8 finishes the background candidate retrieval processing at that point of time, and returns to the processing of FIG. 4.

Specifically, in the background candidate retrieval processing, the CPU 8 extracts, as selectable background images, three-dimensional image data items which satisfy one of the conditions that the selected object image can be arranged without overlapping any of the second parallax objects of the three-dimensional image, or that the selected object image can be arranged without overlapping at least part of one second parallax object but covering the whole of the other one or more second parallax objects, when the object image is superposed on the three-dimensional image, in the case where the three-dimensional image includes at least one second parallax object which has a parallax equal to or larger than the parallax of the selected object image.

Among the three-dimensional image data items which are obtained by the CPU 8 as selectable background images, three-dimensional image data items which satisfy the first condition are image data items which can generate a composed three-dimensional image, in which the user (viewer) can perceive a natural distance for the object, regardless of the superposing position of the object image, when the selected object image is superposed on the three-dimensional image indicated by the image data item as the background.

In addition, three-dimensional image data items which satisfy the second or third condition are image data items which can generate a composed three-dimensional image, in which the user (viewer) can perceive a natural distance for the object, if the superposing position of the object image is adjusted as needed, when the selected object image is superposed on the three-dimensional image indicated by the image data item as the background.

Specifically, three-dimensional image data items retrieved in the background candidate retrieval processing are three-dimensional image data items which indicate three-dimensional images suitable to be superposed with the selected object image. In other words, the three-dimensional image data items retrieved in the background candidate retrieval processing are obtained by excluding three-dimensional image data items which generate a composed three-dimensional image, in which the user (viewer) perceives an unnatural distance for the objects (the user has an unnatural impression), even when the superposing position of the object image is adjusted, when the selected object image is superposed on the three-dimensional image indicated by the image data item as the background.

Figure 5B:
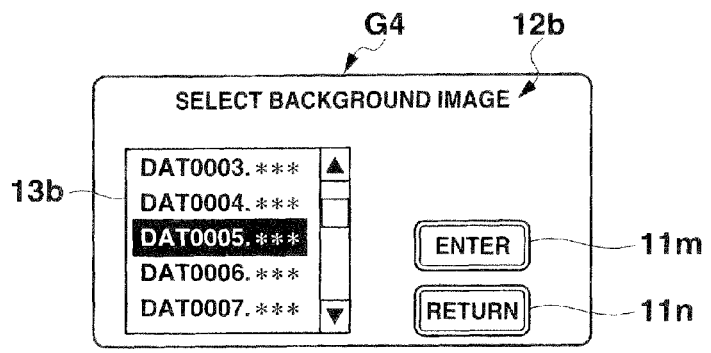

On the other hand, when the above background candidate retrieval processing is finished, the CPU 8 returns to the processing of FIG. 4, and displays a background image selection screen G4 illustrated in FIG. 5B on the display unit 2 first. The background image selection screen G4 is formed of a message 12b such as "Select background image", an image list 13b which shows selectable candidates of three-dimensional image data items retrieved (extracted) in the background candidate retrieval processing, a soft key 11m which shows "Enter", and a soft key 11n which shows "Return".

For the sake of convenience, FIG. 5B illustrates the image list 13b which shows file names of image files in which the respective three-dimensional image data items are stored. However, actually, it is preferable to display a list of thumbnail images which are shown by thumbnail image data items added to the three-dimensional image data items and viewed as three-dimensional images, or thumbnail images which are shown by the left-eye or right-eye thumbnail image data items and viewed as two-dimensional images.

The three-dimensional image data items listed with the image file names in the image list 13b are only specific three-dimensional image data items which satisfy one of the above first to third conditions. Specifically, they are three-dimensional image data items which indicate background three-dimensional images suitable to be superposed with the object image selected by the user.

Therefore, it is unnecessary for the user to perform the troublesome work of checking for each three-dimensional image whether or not the user has an unnatural impression of the composed three-dimensional image, by viewing the selected object image together with each three-dimensional image stored in the storage medium 4 and the built-in memory 6 in a three-dimensional manner. Therefore, it is possible to greatly reduce the time and labor required for the image composition processing.

While the background image selection screen G4 is displayed, when the user selects one of the image file names in the image list 13b by touching the touch panel 3b, the CPU 8 displays the selected image file name as outlined characters. In addition, while the background image selection screen G4 is displayed, when the soft key 11o which shows "Return" is touched (Step SA10: YES), the CPU 8 returns to the processing of Step SA, and displays the object image selection screen G3 on the display unit 2 again.

When the soft key 11m is touched by the user (Step SA9: YES) through the touch panel 3b in the state where any of the three-dimensional image data items is selected as a background image, the CPU 8 executes parallax deriving processing for the three-dimensional image data item selected by the user (Step SA11).

Figure 7:
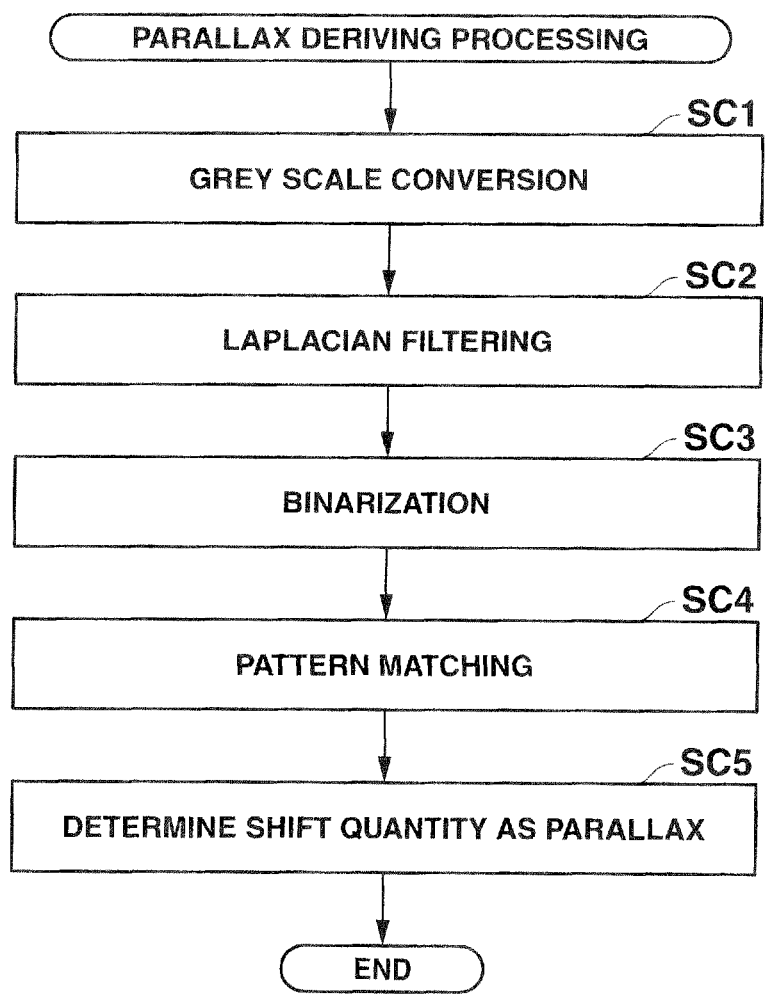
FIG. 7 is a flowchart for explaining parallax deriving processing.

The parallax deriving processing of Step SA11 is the same as the parallax deriving processing executed in the background candidate retrieval processing of Step SA7 (see FIG. 7). Specifically, the CPU 8 obtains the parallax which exists between the left-eye image data item and the right-eye image data item which form the three-dimensional image data item, for each object existing in the three-dimensional image indicated by the three-dimensional image data item selected by the user, according to the steps explained above.

Figure 5C:
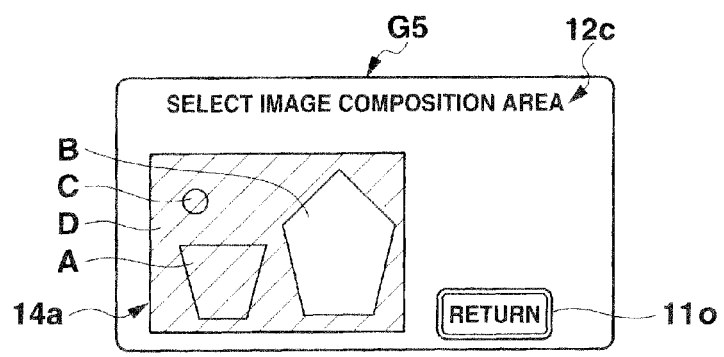

Thereafter, the CPU 8 displays an image composition area selection screen G5 illustrated in FIG. 5C on the display unit 2 (Step SA12). The image composition area selection screen G5 is formed of a message 12c such as "Select composition area", a three-dimensional image 14a which is based on the three-dimensional image data item selected by the user in the background image selection screen G4, and a soft key 11o which shows "Return".

When the image composition area selection screen G5 is displayed, the CPU 8 executes the following processing. Specifically, the CPU 8 specifies a specific area (including a background image area which includes no objects) which has a parallax smaller than the parallax of the selected object image, in a three-dimensional image indicated by the three-dimensional image data item selected by the user, based on information of the parallax of each object that is obtained in the parallax deriving processing of Step SA11.

Then, the CPU 8 displays the three-dimensional image 14a indicated by the three-dimensional image data item selected by the user on the image composition area selection screen G5, such that the specific area is distinguishable from the other area. Any method can be used as a method of distinguishing the specific area from the other area. For example, there is a method of reducing the brightness of the specific area at a specific rate, or displaying the specific area in a grayscale manner (expressing it only by controlling the brightness).

The example of the image composition area selection screen G5 illustrated in FIG. 5C shows the case where the three-dimensional image 14a indicated by the three-dimensional image data item selected by the user includes the three objects A, B and C illustrated in FIG. 9, the object A is the first parallax object which has a parallax smaller than the parallax of the selected object image, and the objects B and C are second parallax objects which have a parallax equal to or larger than the parallax of the selected object image. In addition, an area which is shown with diagonal lines and formed of the object A and the background image area D is the above specific area. Specifically, the specific area is an area where the selected object image can be superposed on three-dimensional image without causing the user to have an unnatural expression on the three-dimensional image.

After the above image composition area selection screen G5 is displayed, the CPU 8 successively checks whether or not a desired coordinate position of the three-dimensional image 14a is touched (designated) by the user, and whether or not the soft key 11o which shows "Return" is touched (Steps SA13 and SA14).

When the user touches the soft key 11o which shows "Return" without touching any coordinate position in the three-dimensional image 14a (Step SA14: YES), the CPU 8 returns to the processing of Step SA8, and displays the background image selection screen illustrated in FIG. 5B on the display unit 2 again.

Figure 5D:
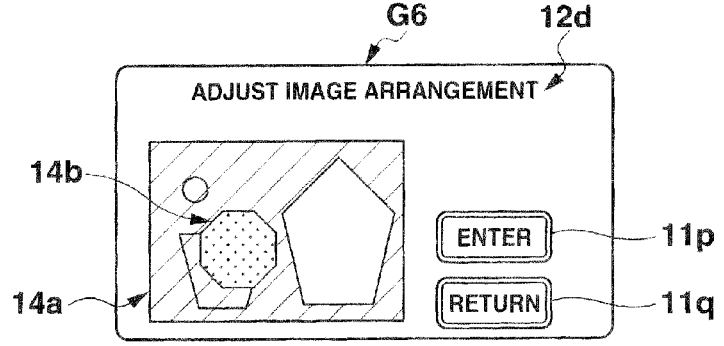

On the other hand, when the user touches a desired coordinate position in the three-dimensional image 14a (Step SA13: YES), the CPU 8 displays an image arrangement adjusting screen G6 illustrated in FIG. 5D on the display unit 2 (Step SA15). The image arrangement adjusting screen G6 includes a message 12d such as "Adjust image arrangement", an image obtained by superposing the selected object image 14b in the position touched by the user on the three-dimensional image 14a displayed in the image composition area selection screen G5, a soft key 11p which shows "Enter", and a soft key 11q which shows "Return".

While the image arrangement adjusting screen G6 is displayed, the user touches, using a finger, the position at which the object image 14b is displayed, and slides the finger on the touch panel 3, and thereby the CPU 8 adjusts the arrangement position of the object image 14b with respect to the three-dimensional image 14a in response to the movement.

The method of adjusting the arrangement position of the object image 14b with respect to the three-dimensional image 14a differs, according to which of the first to third conditions the three-dimensional image 14a satisfies. This will be explained hereinafter.

When the three-dimensional image 14a satisfies the first condition, specifically, the three-dimensional image 14a is a three-dimensional image which includes no objects that have a parallax equal to or larger than the parallax of the object image 14b, the object image 14b may be arranged in any area of the three-dimensional image 14a. Therefore, the arrangement of the object image 14b can be controlled by the CPU 8 such that the object image 14b is arranged within the whole area of the three-dimensional image 14a, without requiring further control.

When the three-dimensional image 14a does not satisfy the first condition but satisfies the second condition, specifically, the three dimensional image 14a includes an object (second parallax object) which has a parallax equal to or larger than the parallax of the object image 14b, and the object image 14b can be arranged in an area excluding the second parallax object in the three-dimensional image 14a, it is necessary to control arrangement of the object image 14b by the CPU 8 such that the object image 14b is arranged in the area excluding the second parallax object.

Therefore, in response to the user's finger movement, when the object image 14b is moved from an area, in which the coordinate position of the object image 14b does not overlap the coordinate position of the second parallax object, to an area in which the coordinate position of the object image 14b overlaps the coordinate position of the second parallax object, the object image 14b is fixedly displayed at coordinates directly before the object image 14b is moved to the latter area. In addition, in response to the user's finger movement, when the object image 14b is moved from an area, in which the coordinate position of the object image 14b overlaps the coordinate position of the second parallax object, to an area in which the coordinate position of the object image 14b does not overlap the coordinate position of the second parallax object, the object image 14*b* may be displayed again in a position which corresponds to the position touched by the user's finger.

When the three-dimensional image 14*a* satisfies neither the first condition nor the second condition but satisfies the third condition, specifically, the three-dimensional image 14*a* includes an object (second parallax object) which has a parallax equal to or larger than the parallax of the object image 14*b*, and the object image 14*b* can be arranged in the three-dimensional image 14*a* such that the object image 14*b* is superposed on the whole second parallax object, it is necessary to control arrangement of the object image 14*b* by the CPU 8 such that the object image 14*b* does not overlap the second parallax object or the object image 14*b* is superposed on the whole second parallax object.

Therefore, in response to the user's finger movement, when the object image 14*b* is moved from an area, in which the coordinate position of the object image 14*b* does not overlap the coordinate position of the second parallax object, to an area in which the coordinate position of the object image 14*b* overlaps the coordinate position of the second parallax object, arrangement of the object image 14*b* is changed (controlled) by the CPU 8 such that the object image 14*b* is superposed on the whole second parallax object. In addition, in response to the user's finger movement, when the object image 14*b* is moved from an area, in which the coordinate position of the object image 14*b* overlaps the coordinate position of the second parallax object, to an area in which the coordinate position of the object image 14*b* does not overlap the coordinate position of the second parallax object, the object image 14*b* may be displayed again at a position which corresponds to the position touched by the user's finger.

Then, when the soft key 11*p* which shows "Enter" is touched (Step SA16: YES), the CPU 8 substitutes the gradation value of each pixel in the last area, at which the object image 14*b* is superposed, in the three-dimensional image 14*a* by the gradation value of each pixel of the object image 14*b*, and thereby generates a three-dimensional image data item which indicates a new three-dimensional image obtained by superposing the object image 14*b* on the three-dimensional image 14*a*. Then, the CPU 8 provides the generated three-dimensional image data item with a predetermined file name, and stores the data item in the built-in memory 6 (Step SA18).

Thereby, the CPU 8 finishes the image composition processing, and the digital photo frame 1 returns to the state where the function selection menu G1 illustrated in FIG. 3A is displayed on the display unit 2. When the soft key 11*q* which shows "Return" is operated in the image arrangement adjusting screen G6 (Step SA17: YES), the CPU 8 returns to the processing of the Step SA8, and displays the background image selection screen G4 illustrated in FIG. 5B on the display unit 2 again.

Figure 10:
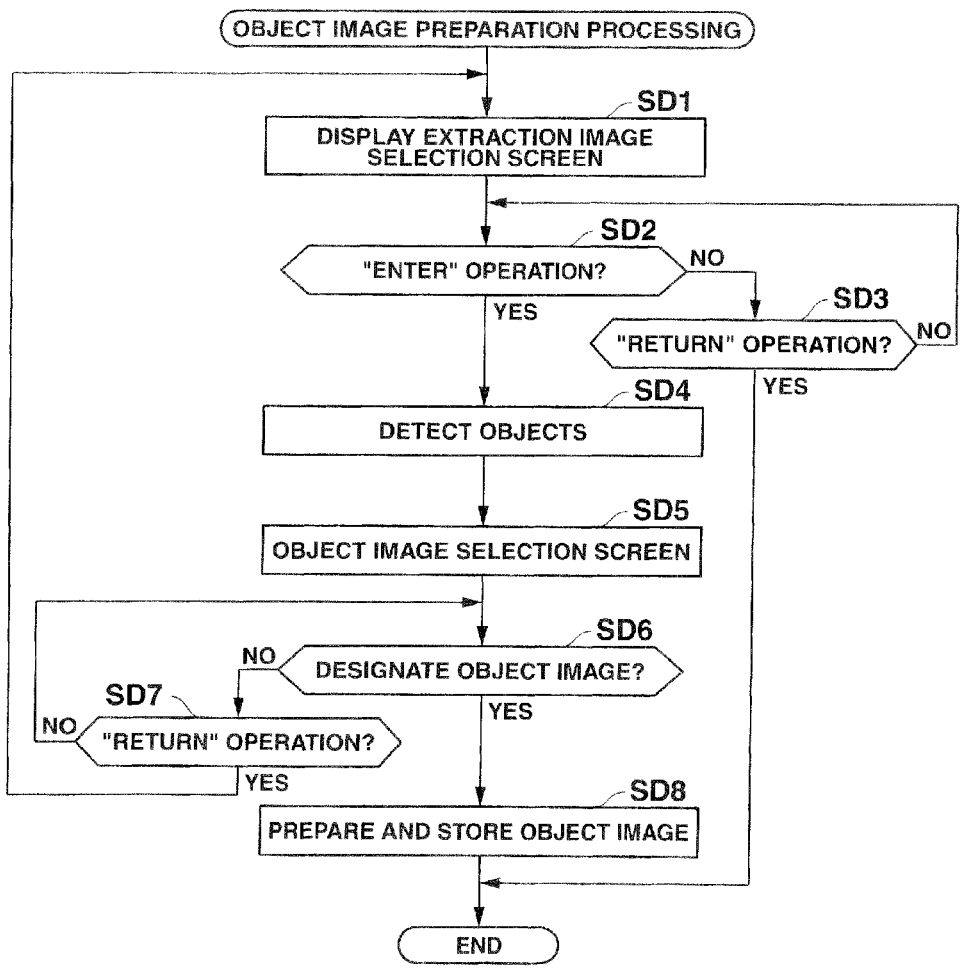
FIG. 10 is a flowchart for explaining object image preparation processing.

Next, the following is an explanation of specific details of the processing executed by the CPU 8 when the user operates the soft key 11*j* which shows "Prepare object" in the object image selection screen G3 illustrated in FIG. 5A, that is, the object image preparation processing of Step SA5 described above, based on the flowchart illustrated in FIG. 10.

In the object image preparation processing, the CPU 8 immediately displays an extraction image selection screen G7 on the display unit 2 (Step SD1). The extraction image selection screen G7 is formed of a message 15*a* such as "Select an image from which an object is to be extracted", an image list 16*a* which shows three-dimensional image data items stored in the storage medium 4 as selectable extraction images, a soft key 17*a* which shows "Enter", and a soft key 17*b* which shows "Return".

Figure 11A:
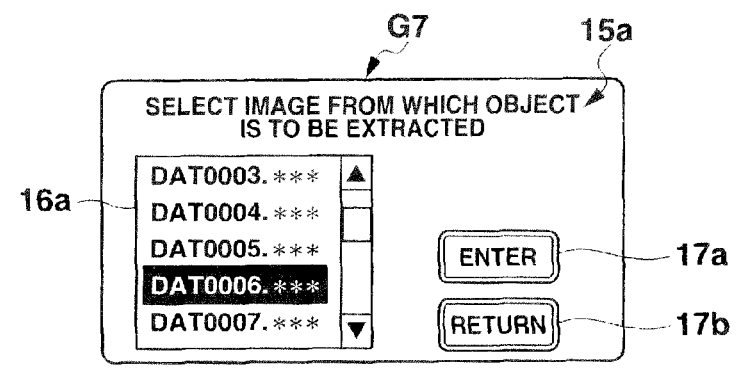

FIG. 11A also shows the image list 16*a* which shows file names of image files in which the respective three-dimensional image data items are stored. However, actually, it is preferable to display a list of thumbnail images which are indicated by thumbnail image data items added to the three-dimensional image data items and viewed as three-dimensional images, or thumbnail images which are indicated by left-eye or right-eye thumbnail image data items and viewed as two-dimensional images.

In addition, when the three-dimensional image data items stored in the storage medium 4 have not changed since the image composition processing, the contents of the image list 16*a* displayed in the extraction image selection screen G7 are the same as the contents of the image list 13*a* displayed in the background image selection screen G4 illustrated in FIG. 5B.

While the extraction image selection screen G7 is displayed, when the user selects any of the image file names displayed in the image list 16*a* by touching the touch panel 3*b*, the CPU 8 displays the selected image file name as outlined characters. When the soft key 17*b* which shows "Return" is touched in the extraction image selection screen G7 (Step SD3: YES), the CPU 8 immediately finishes the object image preparation processing, and displays the object image selection screen G3 on the display unit 2 (Step SA1).

When the soft key 17*a* which shows "Enter" is touched in the state where any of the image file names (three-dimensional image data items) displayed in the image list 16*a* is selected as the extraction image (Step SD2: YES), the CPU 8 executes object detection processing (Step SD4). The object detection processing is processing of detecting any object which exists in the extraction image (three-dimensional image) indicated by the three-dimensional image data item and has parallax between the left-eye image data item and the right-eye image data item that form the three-dimensional image data item.

In the object detection processing, the CPU 8 executes the same parallax deriving processing (see FIG. 7) as the Steps SA11 and SB2 described above for the three-dimensional image data item selected as the extraction image, thereby temporarily detects one or more objects existing in the extraction image, and derives the parallax for each of the detected objects. Thereafter, the CPU 8 extracts only objects which have a parallax that is not 0, as the final objects.

Figure 11B:
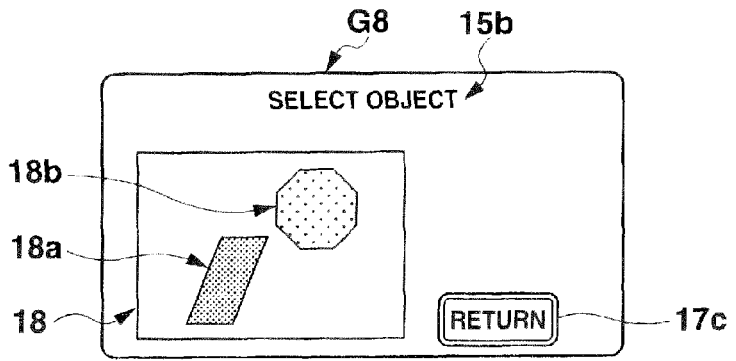

Next, the CPU 8 displays an object selection screen G8 illustrated in FIG. 11B on the display unit 2 (Step SD5). The object selection screen G8 is formed of a message 15*b* such as "Select object", an extraction image 18 in a state where objects 18*a* and 18*b* which are extracted by the object detection processing are emphasized, and a soft key 17*c* which shows "Return".

The CPU 8 emphasizes the objects in the extraction image 18 by, for example, maintaining color display only for the objects and displaying the image area other than the objects in a grey scale manner, such that the objects can be easily distinguished from the other image area.

When the user designates any object through the touch panel 3*b* in the object selection screen G8 (Step SD6: YES), the CPU 8 prepares an object image data item which is obtained by maintaining an image data item of the area that corresponds to the designated object, and deleting the image data item of the other image area. Then, the CPU 8 provides the object image data item with a predetermined file name, and stores the data item in the built-in memory 6 (Step SD8).

Thereby, the CPU 8 finishes the object image preparation processing, and displays the object image selection screen G3 on the display unit 2 (Step SA1).

When the object image data item is stored in the built-in memory 6 in the processing of Step SD7, the CPU 8 adds data items which indicate the size, the shape, and the parallax of the object image data item as additional information to the object image data item.

In addition, when the soft key 17c which shows "Return" is operated in the object selection screen G8 (Step SD7: YES), the CPU 8 displays the extraction image selection screen G7 on the display unit 2.

In the present embodiment described above, when background three-dimensional images suitable to be superposed with the object image selected by the user are retrieved as selectable background images, specific three-dimensional image data items which satisfy one of the first to third conditions are retrieved. Alternatively, for example, the three-dimensional images (specific three-dimensional image data items) to be retrieved as the selectable background images may satisfy only the first condition, or satisfy the first and second conditions.

In addition, for example, the structure in which the user can set the retrieval condition of three-dimensional images to be retrieved as the selectable background images may be adopted, if necessary. Specifically, the structure in which the user can make a setting as to whether the three-dimensional images to be retrieved are three-dimensional images which satisfy only the first condition, satisfy the first or second condition, or satisfy one of the first to third conditions, may be adopted, if necessary.

Even when the retrieval condition of three-dimensional images to be retrieved as the selectable background images is changed as described above, the three-dimensional images to be retrieved as the selectable background images are only three-dimensional images suitable to be superposed with the object image selected by the user. Therefore, it is unnecessary for the user to perform the troublesome work of checking for each three-dimensional image as to whether the composed three-dimensional image produces an unnatural impression, by viewing the selected object image together with each three-dimensional image stored in the storage medium 4 and the built-in memory 6 in a three-dimensional manner. Therefore, it is possible to greatly reduce the time and labor required for the image composition processing.

In the above embodiment, the image displayed on the display unit 2 in the image composition processing and the object image preparation processing may be displayed by using the left-eye image data item and the right-eye image data item such that the image can be viewed in a three-dimensional manner, or using only one of the left-eye image data item and the right-eye image data item such that the image can be viewed in a two-dimensional manner. In addition, the present embodiment may have the structure in which the user can make a selection as to whether the image is displayed in a three-dimensional manner or not.

The above embodiment shows the case where the outline of the object is detected for each of the left-eye image data item and the right-eye image data item, and the parallax of each object is derived based on the difference in coordinate position between the outlines, when the parallax of each object existing in the image is derived for each three-dimensional image stored in the storage medium 4 and the built-in memory 6. Alternatively, the parallax of each object may be derived by using another method. For example, it is possible to directly extract a character part, which is formed in consideration of color information, from one of the left-eye image data item and the right-eye image data item, detect an image which corresponds to the extracted character part from the other image data item, and thereafter determine a position shift quantity between the coordinate positions of them as parallax.

In every case, the parallax of each object in a three-dimensional image is information which is obtained by quantifying the distance which is perceived by the user for the object, and the parallax may be obtained by another method, as long as the parallax which can be compared between the object images (single object) can be derived. The same is applicable to the parallax of the object image, and the parallax of the object image may be derived by a method different from that of the present embodiment.

In addition, the above embodiment shows the case where the object image maintained at equal magnification is superposed on the three-dimensional image, when the object image serving as the foreground is superposed on the three-dimensional image serving as the background. Alternatively, an object image with an enlarged or reduced size and maintained parallax may be superposed on the three-dimensional image.

Further, although the above embodiment shows the case where the object image (material image) which is to be superposed on the background three-dimensional image and serves as foreground is prepared by the digital photo frame 1, the object image may be prepared by any device other than the digital photo frame 1, or obtained from a server existing on the network. The object image may also be prepared from, for example, a single image by using an image processing technique. In addition, a three-dimensional image obtained from a server existing on the network can be used as a background three-dimensional image.

Although the above embodiment shows the case where the image composition apparatus of the present invention is carried out in a digital photo frame, the present invention may be applied to another electronic apparatuses such as digital cameras and mobile phones. The present invention can also be carried out in an all-purpose personal computer. In such a case, the personal computer can be operated based on predetermined application software (program).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image composition apparatus comprising:
 a parallax obtaining unit configured to obtain a parallax that exists in a material image which is viewed as an object in a three-dimensional manner;
 an image retrieving unit configured to retrieve a three-dimensional image that satisfies a predetermined condition as a selectable candidate image from a plurality of three-dimensional images, each of which is viewed in a three-dimensional manner; and
 an image composition unit configured to execute image composition by superposing the material image on the three-dimensional image that is retrieved as the selectable candidate image by the image retrieving unit,
 wherein:
 each of the three-dimensional images includes at least one object,
 the image retrieving unit retrieves the three-dimensional image as the selectable candidate image from the three-dimensional images, on a condition that the at least one object included in the three-dimensional image to be retrieved as the selectable candidate image among the three-dimensional images is a first parallax object which has a parallax that is smaller than the parallax of the material image obtained by the parallax obtaining unit, as the predetermined condition, and the image retrieving unit retrieves the three-dimensional image as the selectable candidate image by excluding, from the three-dimensional images, at least one three-dimensional image, the at least one three-dimensional image being an image in which a viewer would perceive an unnatural distance for the at least one object included therein when the material image is superposed on the at least one three-dimensional image.

2. The image composition apparatus according to claim 1, wherein the image composition unit controls an arrangement of the material image such that the material image is arranged within a whole area of the three-dimensional image, when the material image is superposed on the three-dimensional image.

3. An image composition apparatus comprising:
a parallax obtaining unit configured to obtain a parallax that exists in a material image which is viewed as an object in a three-dimensional manner;
an image retrieving unit configured to retrieve a three-dimensional image that satisfies a predetermined condition as a selectable candidate image from a plurality of three-dimensional images, each of which is viewed in a three-dimensional manner; and
an image composition unit configured to execute image composition by superposing the material image on the three-dimensional image that is retrieved as the selectable candidate image by the image retrieving unit,
wherein:
each of the three-dimensional images includes least one object,
the image retrieving unit retrieves the three-dimensional image as the selectable candidate image from the three-dimensional images, on a condition that the at least one object included in the three-dimensional image to be retrieved as the selectable candidate image among the three-dimensional images is a second parallax object which has a parallax equal to or larger than the parallax of the material image obtained by the parallax obtaining unit, and that the material image has a shape and a size with which the material image is capable of being arranged in an area excluding the second parallax object, as the predetermined condition, and
the image retrieving unit retrieves the three-dimensional image as the selectable candidate image by excluding, from the three-dimensional images, at least one three-dimensional image, the at least one three-dimensional image being an image in which a viewer would perceive an unnatural distance for the at least one object included therein when the material image is superposed on the at least one three-dimensional image.

4. The image composition apparatus according to claim 3, wherein:
each of the three-dimensional images includes a plurality of objects each corresponding to the second parallax object, and
the image retrieving unit retrieves the three-dimensional image as the selectable candidate image from the three-dimensional images, on a condition that the material image has a shape and a size with which the material image is capable of being arranged in an area excluding all of the second parallax objects, as the predetermined condition.

5. The image composition apparatus according to claim 4, wherein the image composition unit controls an arrangement of the material image such that the material image is arranged in the area excluding all of the second parallax objects, when the material image is superposed on the three-dimensional image.

6. The image composition apparatus according to claim 3, wherein:
each of the three-dimensional images includes a plurality of objects each corresponding to the second parallax object, and
the image retrieving unit retrieves the three-dimensional image as the selectable candidate image from the three-dimensional images, on a condition that the material image has a shape and a size with which the material image is capable of being arranged in an area excluding one of the second parallax objects, such that the material image is superposed on a whole of another second parallax object differing from the one of the second parallax objects, as the predetermined condition.

7. The image composition apparatus according to claim 6, wherein the image composition unit controls an arrangement of the material image such that the material image is arranged to be superposed on the whole of the another second parallax object, when the material image is superposed on the three-dimensional image.

8. An image composition apparatus comprising:
a parallax obtaining unit configured to obtain a parallax that exists in a material image which is viewed as an object in a three-dimensional manner;
an image retrieving unit configured to retrieve a three-dimensional image that satisfies a predetermined condition as a selectable candidate image from a plurality of three-dimensional images, each of which is viewed in a three-dimensional manner; and
an image composition unit configured to execute image composition by superposing the material image on the three-dimensional image that is retrieved as the selectable candidate image by the image retrieving unit,
wherein:
each of the three-dimensional images includes at least one object,
the image retrieving unit retrieves the three-dimensional image as the selectable candidate image from the three-dimensional images, on a condition that the at least one object included in the three-dimensional image to be retrieved as the selectable candidate image among the three-dimensional images is a second parallax object which has a parallax equal to or larger than the parallax of the material image obtained by the parallax obtaining unit, and that the material image has a shape and a size with which the material image is capable of being arranged to be superposed on a whole of the second parallax object, as the predetermined condition, and
the image retrieving unit retrieves the three-dimensional image as the selectable candidate image by excluding, from the three-dimensional images, at least one three-dimensional image, the at least one three-dimensional image being an image in which a viewer would perceive an unnatural distance for the at least one object included therein when the material image is superposed on the at least one three-dimensional image.

9. The image composition apparatus according to claim 8, wherein the image composition unit controls an arrangement of the material image such that the material image is arranged to be superposed on the whole of the second parallax object, when the material image is superposed on the three-dimensional image.

10. An image retrieval method, comprising:
obtaining a parallax that exists in a material image which is viewed as an object in a three-dimensional manner;
retrieving a three-dimensional image that satisfies a predetermined condition as a selectable candidate image from a plurality of three-dimensional images, each of which is viewed in a three-dimensional manner; and
executing image composition by superposing the material image on the three-dimensional image that is retrieved as the selectable candidate image in the retrieving of the three-dimensional image,
wherein:
each of the three-dimensional images includes at least one object,
the retrieving includes retrieving the three-dimensional image as the selectable candidate image from the three-dimensional images, on a condition that the at least one object included in the three-dimensional image to be retrieved as the selectable candidate image among the three-dimensional images is a first parallax object which has a parallax that is smaller than the obtained parallax of the material image, as the predetermined condition, and
the retrieving includes retrieving the three-dimensional image as the selectable candidate image by excluding, from the three-dimensional images, at least one three-dimensional image, the at least one three-dimensional image being an image in which a viewer would perceive an unnatural distance for the at least one object included therein when the material image is superposed on the at least one three-dimensional image.

11. An image retrieval method comprising:
obtaining a parallax that exists in a material image which is viewed as an object in a three-dimensional mariner;
retrieving a three-dimensional image that satisfies a predetermined condition as a selectable candidate image from a plurality of three-dimensional images, each of which is viewed in a three-dimensional manner; and
executing image composition by superposing the material image on the three-dimensional image that is retrieved as the selectable candidate image in the retrieving of the three-dimensional image,
wherein:
each of the three-dimensional images includes at least one object,
the retrieving includes retrieving the three-dimensional image as the selectable candidate image from the three-dimensional images, on a condition that the at least one object included in the three-dimensional image to be retrieved as the selectable candidate image among the three-dimensional images is a second parallax object which has a parallax equal to or larger than the obtained parallax of the material image, and that the material image has a shape and a size with which the material image is capable of being arranged in an area excluding the second parallax object, as the predetermined condition, and
the retrieving includes retrieving the three-dimensional image as the selectable candidate image by excluding, from the three-dimensional images, at least one three-dimensional image, the at least one three-dimensional image being an image in which a viewer would perceive an unnatural distance for the at least one object included therein when the material image is superposed on the at least one three-dimensional image.

12. The image retrieval method according to claim 11, wherein the executing the image composition includes controlling an arrangement of the material image such that the material image is arranged in an area excluding the second parallax object, when the material image is superposed on the three-dimensional image.

13. The image retrieval method according to claim 11, wherein the executing the image composition includes controlling an arrangement of the material image such that the material image is arranged to be superposed on a whole of another second parallax object which is different from the second parallax object, when the material image is superposed on the three-dimensional image.

14. A non-transitory computer-readable storage medium having a program stored thereon for controlling a computer to perform image retrieval functions comprising:
obtaining a parallax that exists in a material image which is viewed as an object in a three-dimensional manner;
retrieving a three-dimensional image that satisfies a predetermined condition as a selectable candidate image from a plurality of three-dimensional images, each of which is viewed in a three-dimensional manner; and
executing image composition by superposing the material image on the three-dimensional image that is retrieved as the selectable candidate image in the retrieving of the three-dimensional image,
wherein:
each of the three-dimensional images includes at least one object,
the retrieving includes retrieving the three-dimensional image as the selectable candidate image from the three-dimensional images, on a condition that the at least one object included in the three-dimensional image to be retrieved as the selectable candidate image among the three-dimensional images is a first parallax object which has a parallax that is smaller than the obtained parallax of the material image, as the predetermined condition, and
the retrieving includes retrieving the three-dimensional image as the selectable candidate image by excluding, from the three-dimensional images, at least one three-dimensional image, the at least one three-dimensional image being an image in which a viewer would perceive an unnatural distance for the at least one object included therein when the material image is superposed on the at least one three-dimensional image.

15. A non-transitory computer-readable storage medium having a program stored thereon for controlling a computer to perform image retrieval functions comprising:
obtaining a parallax that exists in a material image which is viewed as an object in a three-dimensional manner;
retrieving a three-dimensional image that satisfies a predetermined condition as a selectable candidate image from a plurality of three-dimensional images, each of which is viewed in a three-dimensional manner; and
executing image composition by superposing the material image on the three-dimensional image that is retrieved as the selectable candidate image in the retrieving of the three-dimensional image,
wherein:
each of the three-dimensional images includes at least one object,
the retrieving includes retrieving the three-dimensional image as the selectable candidate image from the three-dimensional images, on a condition that the at least one object included in the three-dimensional image to be retrieved as the selectable candidate image among the three-dimensional images is a second parallax object which has a parallax equal to or larger than the obtained parallax of the material image, and that the material image has a shape and a size with which the material image is capable of being arranged in an area excluding the second parallax object, as the predetermined condition, and the retrieving includes retrieving the three-dimensional image as the selectable candidate image by excluding, from the three-dimensional images, at least one three-dimensional image, the at least one three-dimensional image being an image in which a viewer would perceive an unnatural distance for the at least one object included therein when the material image is superposed on the at least one three-dimensional image.

16. The storage medium according to claim 15, wherein the executing the image composition includes controlling an arrangement of the material image such that the material image is arranged in an area excluding the second parallax object, when the material image is superposed on the three-dimensional image.

17. The storage medium according to claim 15, wherein the executing the image composition includes controlling an arrangement of the material image such that the material image is arranged to be superposed on a whole of another second parallax object which is different from the second parallax object, when the material image is superposed on the three-dimensional image.

* * * * *

UNITED STATES PATENT AND TRADEMARK OFFICE
CERTIFICATE OF CORRECTION

PATENT NO.         : 9,280,847 B2
APPLICATION NO.    : 13/272448
DATED              : March 8, 2016
INVENTOR(S)        : Kiyoshi Ogishima et al.

It is certified that error appears in the above-identified patent and that said Letters Patent is hereby corrected as shown below:

Claims

Column 21, line 34, claim 3, after "includes" insert --at--.

Signed and Sealed this
Seventeenth Day of May, 2016

Michelle K. Lee
*Director of the United States Patent and Trademark Office*